June 28, 1960   C. E. GALLAGHER   2,942,807
POSITION STABILIZED PENDULUM CONTROL APPARATUS
Filed July 30, 1954   2 Sheets-Sheet 1
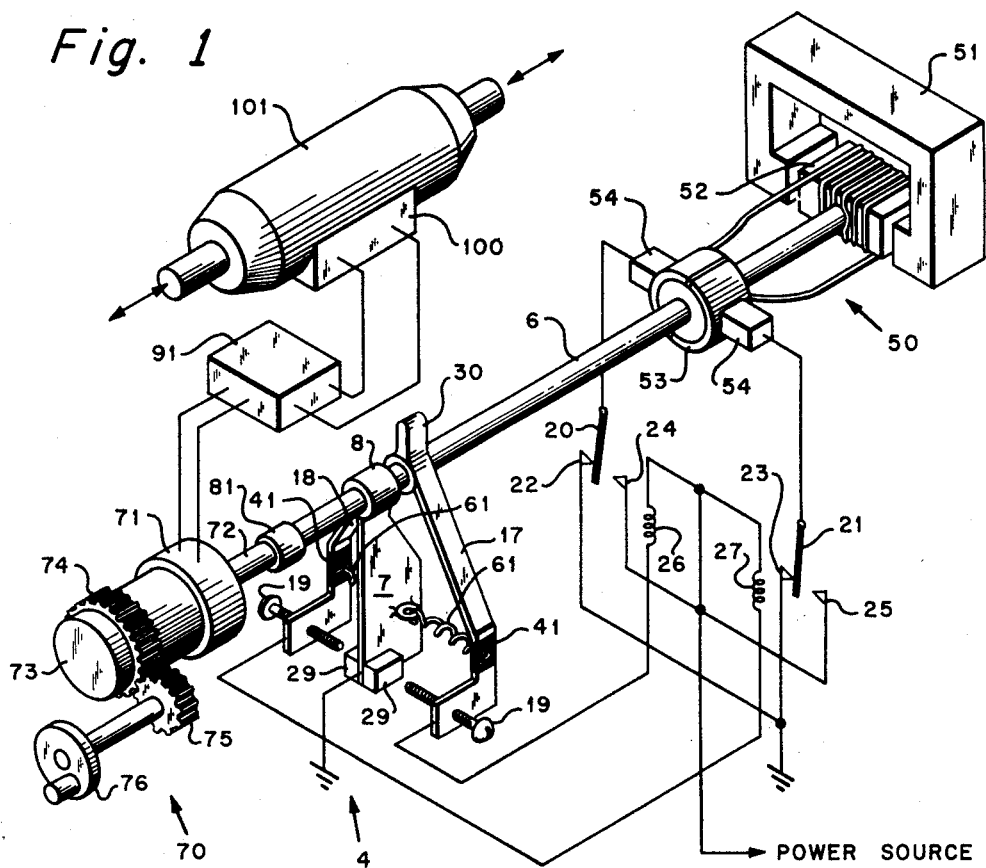
Fig. 1
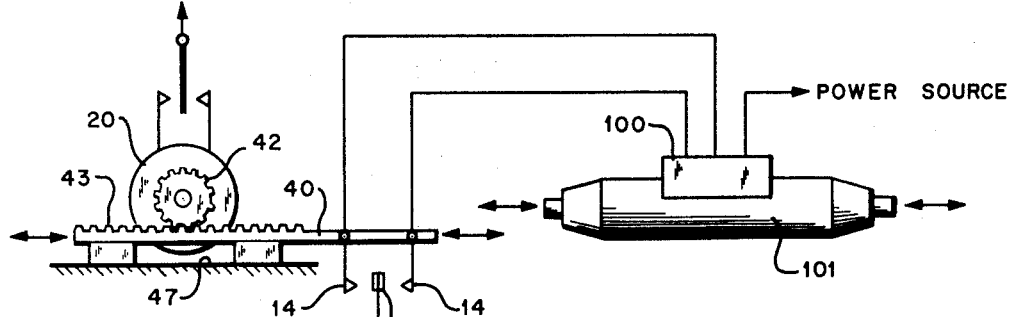
Fig. 2
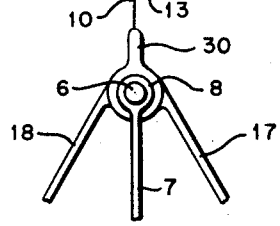
INVENTOR.
CHARLES E. GALLAGHER
BY
*L. M. Smith, Jr.*
ATTORNEYS

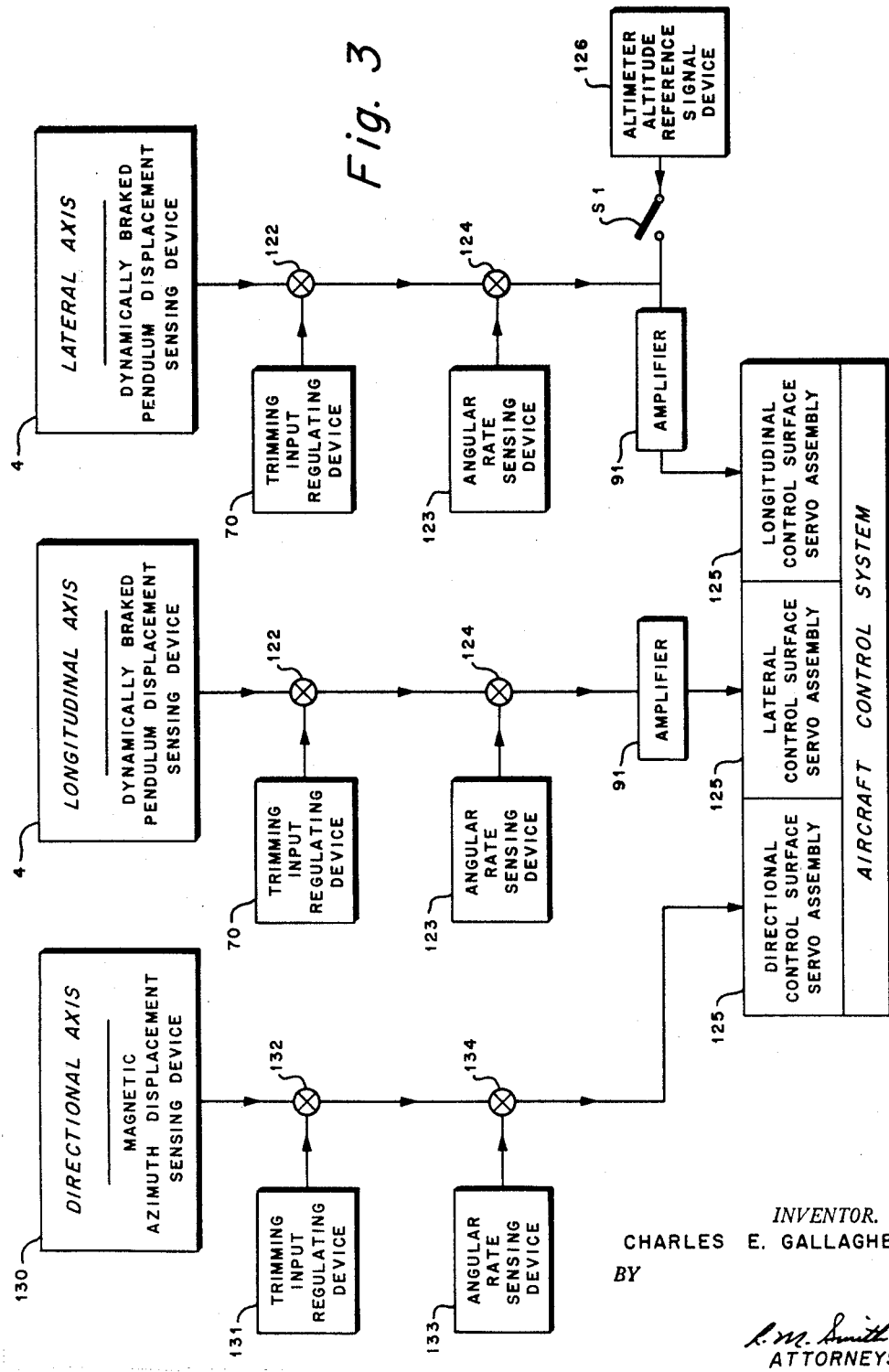

United States Patent Office

2,942,807
POSITION STABILIZED PENDULUM CONTROL APPARATUS

Charles E. Gallagher, 344 W. Court St., Doylestown, Pa.

Filed July 30, 1954, Ser. No. 446,984

5 Claims. (Cl. 244—80)

(Granted under Title 35, U.S. Code (1952), sec. 266)

The invention described herein may be manufactured and used by or for the Government of the United States of America for governmental purposes without the payment of any royalties thereon or therefor.

The invention relates to a position stabilized pendulum control apparatus and more particularly relates to apparatus for control of lateral, longitudinal and directional stability of an aircraft in order to maintain desired attitude in straight and level flight and during maneuvers.

Various types of pendulums have been designed for automatic control purposes in aircraft. Prior art types, however, have been generally unsatisfactory because of the lack of suitable damping means thereby making them unstable or critically damped. Although conventional damping means normally retard the velocity of a pendulum, the pendulum will still follow a harmonic motion generally with considerable velocity and certainly with a velocity which is greatest at the null or neutral point. This residual velocity of the pendulum at the null point carries it past center thus setting up an oscillating condition making for unsatisfactory operation for aircraft or other dynamic applications.

The inventive pendulum apparatus removes these and other deficiencies of the prior art and in addition removes substantially all harmonic motion, governs the momentum of the pendulum by retarding its velocity to a controlled value, and provides dynamic braking through the application of well-known configurations for this purpose to a reversible electric motor arranged to operate in response to substantial and continuing displacement of the pendulum in either direction. Since the fundamental principle by means of which dynamic braking of an electric motor is achieved, that is by shorting either the field or the armature of the electric motor to provide for current reversal therein, is universally recognized and hence not of itself a significant feature of the instant invention, the schematic representation of a motor as illustrated in this application will be limited to the simplest possible conventional representation of the basic operating element of a motor in relation to the additional components comprising the dynamic braking means of the instant invention.

Accordingly, an object of the inventive device is to provide a steady reference of gravity or apparent gravity sufficient for indication or control purposes particularly as applied in aircraft usage.

Another purpose of the invention is to present a pendulum type device designed for automatic control purposes in aircraft which will have suitable damping means to prevent undesirable oscillating conditions.

Another aim of the invention is to present a pendulum device suitable for automatic control purposes wherein undersirable harmonic motion will be substantially removed and the momentum of the pendulum will be controlled by retarding its velocity to a controlled value and wherein dynamic braking is provided.

Another object of the invention is to present a pendulum device which will indicate apparent vertical position in manuevers and will be satisfactory for aircraft flight control and wherein the device may be trimmed into the aircraft reference attitude.

Another aim of the invention is to present a steady reference of gravity or apparent gravity sufficient for indication and control purposes particularly intended for aircraft usage and wherein directional control to readily fix the heading and supplementary rate control for damping may be provided.

A further object of the invention is to provide for the automatic return of a craft to a level or a desired attitude following an externally induced departure from normal attitude due to transient atmospheric conditions such as gust loads.

A further object is to utilize a plurality of dynamically braked pendulous bodies as the agency for actuation of means for maintaining an aircraft's horizontally disposed reference axis in desired planes.

Another purpose of the invention is to present a system that is economical to construct, reliable in operation, light in weight, sturdy, mechanically and electroncally simple and sufficient for complete angular control of aircraft and expendable missiles where a very high degree of controllability is not essential.

Other objects and many of the attendant advantages of this invention will be readily appreciated as the same becomes better understood by reference to the following detailed description when considered in connection with the accompanying drawings wherein:

Fig. 1 is a partially diagrammatic and partially schematic representation of a preferred embodiment of the inventive pendulum apparatus for use in control systems and illustrating the dynamic braking circuit, Fig. 2 is a schematic representation of another embodiment of the means associated with the inventive pendulum apparatus to constitute an aircraft control system, and, Fig. 3 is a block representation of the instant invention incorporated in a complete automatic control system for an aircraft or missile.

Generally the invention provides a position stabilized pendulum device for control of aircraft. A pendulum freely supported on bearings on the output shaft of a low speed electric motor, a forked pendulum follow-up yoke member securely fastened to the motor shaft and carrying a pair of adjustable contacts connected in the motor control circuit, the follow-up yoke member straddling the pendulum and prohibiting it from swinging except for the very small clearance between electrical contact screws adjustably mounted in the free ends of the respective legs of the forked follow-up yoke member and cooperating contacts mounted upon opposite sides of the free end of the pendulum and a dynamic braking circuit for braking the motor the instant contact between either contact screw and the associated contact on the pendulum is broken. When the pendulum strikes either contact screw as the result of displacement of the pendulum, the shaft of the motor is caused to rotate in the same direction as the pendulum, thus following the movement of the pendulum.

Referring to the drawings and more particularly to Fig. 1, a pendulum 7 freely supported by bearing 8 on shaft 6 of an electric motor generally designated by the reference numeral 50, which motor may be a low speed, permanent magnet motor, in which case the means for shorting the inductive winding of one operating element of the motor 50 in order to provide dynamic braking thereof must necessarily be connected to the inductive winding of the armature 52 of motor 50, since an induced reversal of current in the field 51 is precluded in this type of motor with a permanently magnetized field.

The desired speed of the motor will depend upon the frequency and amplitude of the motion of the aircraft control device characterizing the instant invention. In general, the motor speed should be maintained as high as possible with respect to the time constants of the relay and motor arrangement to be described later. Speeds of 20° per second to 25° per second have been utilized, but the invention is not to be construed as limited to that range. Securely fastened to the motor shaft 6 is the pendulum follow-up yoke member 30, having legs 17 and 18. Insulation 41 on the legs may be provided to prevent short circuiting. The follow-up yoke 30 straddles the pendulum 7 and prohibits it from swinging except for the very small clearance between the electrical contact screws 19 and the respective contacts 29 mounted on opposite sides of the free end of the pendulum 7. The gaps between the respective contacts 29 on pendulum 7 and the adjacent portions of contact screws 19 should be very small, several one thousandths of an inch, for example. Since the follow-up yoke 30 has a symmetrical configuration about its point of attachment to the shaft 6 it is normally suspended from this point so that neither contact screw 19 is in engagement with its associated contact 29 on the pendulum 7 even though the total spacing between the respective contact screws 19 and the respective contacts 29 is extremely small. The exact amount of clearance provided will depend upon the damping of the pendulum and whether the system is being utilized as a stable or "hunting" control servo. When one of the contacts 29 on the pendulum 7 strikes either contact screw 19 the shaft 6 of the motor 50 is caused to rotate thus following the pendulum 7. The instant contact is broken by rotation of shaft 6 and the follow-up yoke member 30 attached thereto, the motor 50 is dynamically braked. Dynamic braking is caused by the fact that motor 50 is a D.C. motor having its field continuously energized as, for example, in a condition of permanent magnetism or by a separately excited winding thereon. Therefore, shifting of the contacts 19 relative to contacts 29, to remove power from the motor will cause motor 50 to function as a generator thereby causing an abrupt or very rapid cessation of motor action due to deenergization of the armature 52 and the consequent restraining action exerted thereon by the energized field 51 of the motor 50, since both of the movable contacts 20 and 21 connected to the armature winding through brushes 54 and the commutator 53 are connected to ground, as shown in Fig. 1, when both of the relays 26 and 27 controlling these contacts are deenergized by separation of the contacts 19 and 29. Hence, the movable contact 20 moved from fixed contact 22 to fixed contact 24 by energization of the relay coil 26 and the movable contact 21 moved from fixed contact 23 to fixed contact 25 in response to energization of the relay coil 27, together with the circuitry connecting fixed contacts 22 and 23 to ground, connecting fixed contacts 24 and 25 to a power source, connecting movable contacts 20 and 21 to the brushes 54 of the motor 50 and connecting the relay coils 26 and 27 to the contacts 19 and 29 and thence to ground, comprise a motor control circuit including the dynamic braking circuit characterizing the instant invention. Alternatively, the leads from the movable contacts 20 and 21 of the instant invention may be connected to the ends of the inductive winding on the field of a motor in which the field is not permanently magnetized while the direction of current flow through the armature of such a motor remains unchanged. Since the dynamic braking capabilities of a motor so arranged are essentially the same, the manner of operation and the results achieved with the device comprising the instant invention would remain the same with this alternative internal arrangement of the elements of the motor cooperating with the pendulum.

Regardless of the internal connections within motor 50, most instantaneous accelerations will be damped out in the response time of the motor, without resulting displacement of shaft 6, while accelerations of sufficient duration to substantially effect the attitude of an aircraft in which the instant invention is incorporated would produce a responsive angular displacement of the shaft 6. In addition, the oscillatory motion of the pendulum 7 is desirably restricted by suitable damping means such as opposed mechanical springs 61 illustrated in Fig. 1 and arranged to interconnect the pendulum 7 and the respective legs 17 and 18 of the follow-up yoke member 30 in such a manner that these springs do not short out the contact screws 19 and the contacts 29. In the simplest configuration of the instant invention motor 50 may itself serve as an aircraft control servo, since the angular displacement of the shaft 6 of the motor is in the same direction and of the same magnitude as the displacement of the pendulum 7. A more advanced embodiment as shown in Fig. 1, includes a conventional synchro assembly 71, the rotor 72 of which is mechanically connected as by coupling 81 to the shaft 6 of the motor 50. With this arrangement, angular displacement of the rotor 72 with shaft 6 relative to the stator 73 of the synchro 71 generates a signal which is transmitted through amplifier 91 and actuates transfer valve 100 to operate a conventional servo assembly 101 arranged to move the control surfaces which regulate displacement of an aircraft about either its longitudinal or lateral axis.

In properly coordinated maneuvers pendulum 7 will continue to remain pointed at or to oscillate within the limited space between contact screws 19 about an apparent vertical axis directed to the base or floorboard of the aircraft. That is, an acceleration due to change in direction occasioned by deviation from straight and level flight during a maneuver will introduce a horizontal component of force on pendulum 7 which when combined with the component of force due to gravity directed toward the earth's surface, will give a resultant force tending to point the pendulum toward an apparent vertical position directed to the base or floorboards of the aircraft. Therefore, both in straight and level flight and during maneuvers the pendulum 7 will remain disposed in its null or neutral position perpendicular to the horizontal reference axis of an aircraft which is perpendicular to the horizontal reference axis about which it is pivotally suspended, so long as the aircraft maintains a proper attitude. Consequently, any deviation of the aircraft from the desired attitude will cause a corrective response from the system comprising the instant invention due to displacement of the pendulum from its null or neutral position. Accordingly, the instant invention thus provides for continuously coordinated maneuvers as well as controlled straight and level flight.

Another embodiment of the instant invention incorporating a simplified means for detecting the direction of angular displacement of the shaft 6 and transmitting this intelligence to a transfer valve 100 for regulating a control surface servo 101 is illustrated in Fig. 2. In this embodiment, the pick-off comprises an arm 10 which may conveniently be mounted upon the follow-up yoke member 30 so that it extends radially relative to shaft 6 with its free end and contacts 13 thereon positioned between a pair of closely spaced fixed contacts 14 electrically connected to the transfer valve 100 either directly as shown or through suitable amplifying means, so that when either contact 14 is engaged by a contact 13 a circuit is completed which produces displacement of the servo 101 and accompanying movement of the control surface to which it is connected in the direction which compensates for the detected displacement of the shaft 6.

The operation of an aircraft frequently involves trimming of the control surfaces in order to stabilize the aircraft in the desired flight attitude under various flight conditions, or to select a different flight attitude. This trimming operation, generally accomplished by angular displacement of a control surface from its null or neutral position to a new null position, may be accomplished in the instant invention as illustrated in Fig. 1 by providing trimming means, generally designated by the reference numeral 70 in Fig. 1, such as gears 74 and 75 and crank 76 for manual angular displacement of the stator 73 relative to the rotor 72 of the synchro assembly 71 in order to superimpose a trim signal on the signal due to displacement of shaft 6 and thereby modify the relationship between the position of a control surface connected to servo 101 and the null or neutral position of the pendulum 7. Hence, the signal generated by the synchro 71 in response to the manipulation of the crank 76 for trimming purposes is combined differentially with the signal generated thereby in response to angular displacement of the shaft 6 due to movement of the pendulum 7. The crank 76 which constitutes a simplified showing of trimming means can, of course, be replaced by a remotely controlled reversible electric motor as shown in Fig. 2 or other suitable conventional means for adjustably positioning the stator 73 of the synchro 71.

Corresponding trimming means may be provided in the embodiment illustrated in Fig. 2 by mounting the fixed contacts 14 on an electrically insulated bar 40 which is slidably supported upon the supporting structure 47 therefor and positioned by the gear 42 engaging the rack 43 on the bar 40 and controlled by suitable means such as reversible motor 20 employed as the actuating means for this trimming device.

In either embodiment of the instant invention described above, the servo 101 may be provided with conventional follow-up means for returning the control surface thereby to a neutral position when the control force necessary to return the aircraft to the desired attitude has been applied to the aircraft by the control surface. For example, the leading signal generated by a conventional angular rate sensing device may be combined with those generated by the instant invention in response to displacement of the pendulum 7 and by the trimming means 70.

It is not necessary for the pendulum to have unlimited speed of response for satisfactory use as a reference in automatic control of aircraft. Full throw of the control surfaces in approximately five seconds is enough. This is the maximum required speed for most applications. Since nothing is gained by having a referenced response faster than the actual mechanical output of the servos, it is not necessary for the pendulum to have a substantially faster angular rate than the equivalent angular velocity of the control surface. The pendulum follow-up could also serve as the servo torque motor or it could serve merely as a means of operating an indicator or pick-off for the operation of a larger servo motor, as illustrated in Fig. 1.

The device comprising the instant invention as illustrated in Fig. 1 shows a unit generally designated by reference numeral 4 and including motor 50 which provides control about a single horizontal axis of an aircraft. However, this device may be used to provide a complete aircraft control system by combining two such units, for control about the lateral and longitudinal axes of an aircraft, respectively, with means for controlling an aircraft about its vertical or directional axis, as shown in Fig. 3. Referring first to the means provided for controlling an aircraft about its longitudinal axis, a dynamically braked pendulum displacement sensing device 4 arranged as illustrated in Fig. 1 provides the means for detecting angular displacement of an aircraft about its longitudinal axis. The signal emanating from the displacement sensing device 4 is combined algebraically with the signal generated by the trimming input regulating device 70 by means such as the synchro assembly 71 shown in Fig. 1, designated schematically in Fig. 3 by the symbol 122 representing a first differential mechanism. The combined signal thus obtained may be further modified by being added algebraically to that generated by a conventional angular rate sensing device 123, arranged to detect the rate of displacement about the longitudinal axis of an aircraft, for example, in a second differential mechanism 124 and thence be transmitted through amplifier 91 to the lateral control surface servo assembly 125 including a transfer valve 100 and a servo 101 to displace the servo in the direction which will produce compensating displacement of the lateral control surfaces. The conventional angular rate device represented in Fig. 3 by reference numeral 123 is provided to supply lead in the network in order to lead the movement of the control surfaces in anticipation of deviation from and subsequent restoration to the desired attitude with respect to the longitudinal axis. In addition, the angular rate device may also be arranged to feed in a component of signal which provides error dissipation due to the delays in the system occasioned by the response time of the mechanisms included therein. Thus, the components described above together form that element of a complete aircraft control system which controls movement of an aircraft about its longitudinal axis by means of suitable lateral control surfaces therefor such as conventional ailerons. A second dynamically braked pendulum displacement sensing device 4, as shown in Fig. 1, may be used as means for detecting angular displacement of an aircraft about its lateral axis. The signal generated by the second sensing device 4 is combined algebraically with that supplied by the associated trimming input regulating device 70 in a first differential mechanism 122 and the resulting signal may be combined with that produced by a conventional angular rate sensing device 123 in a second differential mechanism 124 for transmission through amplifier 91 to the longitudinal control surface servo assembly 126 including a second transfer valve 100 and a second servo 101. The components enumerated thus far together form that element of a complete aircraft control system which controls displacement of an aircraft about its lateral axis by means of suitable longitudinal control surfaces therefor such as conventional elevators. This element of the system may also include an altimeter device 126 arranged to generate an altitude reference signal proportional to deviations from a predetermined altitude at which it is desired to maintain an aircraft in straight and level flight. When maintenance of a predetermined altitude is desirable, switch S1 may be closed to superimpose the signal generated by the altimeter device 126 upon the signal in this element of the system. The magnitude and sense of the signal introduced through switch S1 from the altimeter device 126 must be arranged to be such that the control surface regulated by the servo to which this signal is transmitted is displaced in the direction and to a degree which will return the aircraft to the desired altitude. Thus, this element of the system is continuously effective to regulate the position of control surfaces arranged to effect longitudinal control such as conventional elevator surfaces as long as switch S1 is closed.

Although it is true that the pendulum will not indicate true vertical during maneuvers, but apparent vertical, it will be satisfactory for aircraft flight because such a device functioning on the lateral axis and a similar one on the longitudinal axis will fly the aircraft such that apparent gravity remains normal. If any other relationship of the aircraft to the apparent gravity is desired, it may be trimmed into the reference differentially.

The means for detecting angular displacement about the directional or vertical axis of an aircraft may constitute a magnetic device including rotatably mounted means continuously seeking magnetic north just as the pendular device shown in Fig. 1 includes means for continuously seeking a vertical position and means for sensing the direction and measuring the magnitude of displacement of the means seeking true north from a predetermined null or neutral position. Such a device is designated in Fig. 3 by the reference numeral 130 and details thereof have been omitted since such devices are conventional and well-known. In fact, other conventional means of sensing the magnitude and sense of an angular displacement about a vertical axis such as a radio compass may be substituted for the magnetic means described above. In either case, the signal emanating from the azimuth displacement sensing device 130 is combined with the signal introduced by the trimming input regulating device 131 by a differential mechanism 132 or by other suitable means therefor. The resulting signal is combined with that of an angular rate sensing device 133 in a second differential mechanism 134 or other suitable means therefor and transmitted therefrom either directly or through a suitable amplifier, as necessary, to the directional control surface servo assembly 125 to position the directional control surface such as a conventional rudder assembly or other suitable means to compensate for angular displacement of the aircraft about its directional or vertical axis.

*Operation*

Referring in particular to the showing in Fig. 1, the operation of a single unit 4 embodying the instant invention will first be described. Assume a deviation from vertical in a direction having a component normal to the pendulum when at rest and perpendicular to the axis of shaft 6 of the servo motor 5. A momentary deviation from vertical will cause a momentary motion of the pendulum 7 which will be of too short duration for actuation of either relay 26 or 27 to produce energization of the armature winding of the motor 50 and thereby cause rotation of its shaft 6. Upon deviation of the aircraft in which the instant invention is incorporated from the desired attitude therefor for an appreciable period one of the contacts 29 will be constantly either interruptedly or continuously urged against the adjacent electrical contact screw 19 depending upon the direction of deviation from vertical so that relay 26 or 27 will become energized due to connection between the power source (preferably a D.C. source of the value of about 24 volts) and its closed circuit through the electrical contact screw 19 and the adjacent contact 29 of the pendulum to ground. This relatively extended continuing engagement of one contact with one contact screw which may be considered to be preferential bearing engagement will cause the corresponding movable contact 20 or 21 of the respective relay 26 or 27 to shift causing power to be applied to the winding of armature 52 of motor 50 thereby causing rotation of the shaft 6 of the motor in a direction such that the attached pendulum follow-up yoke member 30 will rotate in a direction tending to break connection with the adjacent contact 29. This process will continue with continuing preferential displacement of the pendulum 7 in either direction until the pendulum 7 has reached a position in relation to the legs 17, 18 of the forked pendulum follow-up yoke member 30 such that it is oscillating or suspended non-preferentially between the contact screws 19 so that the energized relay 26 or 27 respectively becomes deenergized. The rotation of the shaft 6 of motor 50 then stops, the motor being dynamically braked. As hereinbefore indicated the motor 50 through rotation of shaft 6 may directly actuate the control surfaces of the aircraft controlled thereby to positions tending to restore the aircraft to desired equilibrium conditions or the output of the pendulum motor 50 could be connected by means of a differential as best shown in Fig. 3 to an angular rate unit and a trimming device, the sum output from the pendulum device, the trimming device and the angular rate device thereby directly or through additional signal amplifying means driving the control surface or the control device therefor, such as a servo, to provide not only primary stabilization but also proper control lead for damping of the aircraft motion. In the restoration function, the return of the aircraft to reference position would cause constant urging of pendulum 7 in the opposite direction than initially when the aircraft became displaced from the desired attitude. This would cause the other contact 29 on the pendulum to be constantly urged against the other contact screw 19 to thereby complete the circuit through the corresponding other relay 26 or 27 whose respective movable contact 20 or 21 would shift to engage fixed contact 22 or 25 to energize the armature 52 and thereby cause the motor shaft 6 of motor 50 to rotate in the opposite direction so as to restore the control surface controlled thereby to its neutral reference position. Thereafter, subsequent oscillation of the pendulum 7 through its neutral position would cause deenergization of the respective relay 26 or 27 and the dynamically braked motor 50 would stop rotation and would not then further rotate unless an appreciable displacement of the pendulum for an appreciable continuing period of time were to again occur.

In summary the auto pilot operation sequence may be thought of as steps as follows:

(1) Sensing deviation from desired attitude by the pendulum
(2) Compensating control surface movement
(3) Sensing of the compensating control surface movement associated with compensation for deviations
(4) Reversing movement of the control surfaces to restore null or desired attitude position.

Whenever a change of attitude of the aircraft about a given reference axis such as its longitudinal or lateral axis is desired, this change of attitude may be provided by adjustment of the trimming device provided for this purpose which is generally designated in Fig. 1 by reference numeral 70, and includes a crank 76 and associated gears 74 and 75 for positioning stator 73 of the synchro assembly 71. Alternatively, in the embodiment illustrated in Fig. 2, trimming is achieved by operation of the trimming motor 20 in the proper direction to produce the desired displacement of the bar 40 and the contacts 14 mounted thereon. In either of these embodiments, operation of the trimming device superimposes a signal for trimming purposes upon that normally generated by the pendular device so that the system seeks a stable setting at a neutral or null position of the control surfaces displaced from the original null or neutral position therefor.

In a complete aircraft control system, two units of the type illustrated in Fig. 1 would be used for the lateral reference control and the longitudinal reference control of an aircraft in which this system is incorporated. For directional control as illustrated in Fig. 3 a gravity pendulum device could not be used directly as shown. However, a magnetic device could be used for displacement about the magnetic field of the earth due to yaw of the aircraft about an azimuth reference position. A similar follow-up yoke member operably associated with the angular displacement sensing means of such a magnetic device, a reversible motor and dynamic braking circuit arranged generally as shown in Fig. 1 could be utilized to operate in the event of displacement causing yaw and thereby generate a compensating directional control signal or mechanical motion which may be combined with the trimming device mechanical motion or signal and the angular rate device mechanical motion or signal in the manner illustrated in Fig. 3 to provide for restoration of the desired aircraft heading when yaw occurs.

There is thereby provided an inexpensive reliable, lightweight, sturdy mechanically and electronically simple circuit sufficient for complete angular control of aircraft and expendable missiles where very high degree of controlability is not a requirement, which will provide a steady reference of gravity or apparent gravity sufficient for indication or control purposes, and be particularly useful in aircraft applications. The device as illustrated will provide damping means removing substantially all harmonic motion and controlling the momentum of the pendulum by retarding its velocity to a controlled value and will provide dynamic braking.

Obviously many modifications and variations of the present invention are possible in the light of the above teachings. It is therefore to be understood that within the scope of the appended claims the invention may be practiced otherwise than as specifically described.

What is claimed is:

1. In a position-stabilized pendulum device for control of aircraft: a pendulum journaled from and freely oscillatory about a shaft, an electric motor drivingly connected to said shaft, follower means attached to said shaft and actuated by said motor and responsive to the pendulum position for limiting the oscillation thereof, control means for extending the oscillatory limit of said pendulum in either direction of its displacement, and dynamic braking means connected to said control means and said motor for modifying the extension produced, whereby the pendulum oscillation is controlled at a desired rate.

2. Apparatus for control of aircraft including pendulum apparatus, said pendulum apparatus comprising a permanent magnet low speed motor having an operating element including at least one inductive winding, a direct current power source, a motor shaft driven by said motor, a pendulum follow-up yoke member fixedly secured in straddling relationship to said shaft, a pendulum rotatably mounted on said shaft, said yoke member having a pair of bowed leg members straddlingly positioned with respect to the lower portion of said pendulum member, said pendulum member being electrically grounded, first and second electrical contacts perpendicularly disposed with respect to the adjacent portions of the bowed members of said yoke member, and in relatively close proximity to said pendulum member, when it is disposed in its neutral or null position, respective relay means connected between the power source and each of the electrical contacts, contact of the pendulum member upon oscillation to a substantially greater degree with one contact than the other causing the respective relay connected thereto to become energized through current flow between the ground of the pendulum and the power source, relay contact means for each relay arranged to be displaced upon energizing of each of said relays, said relay contact means upon being actuated being connected to the power source to supply power to said operating element of the motor to cause the motor to rotate in a given direction, thereby causing rotation of the motor shaft and the fixedly secured pendulum follower in a direction to reduce the amount of continuing contact of the pendulum member with one electrical contact to the exclusion of contact with the other, pick-off means connected to and movable with said pendulum follow-up yoke member and means responsive to the signal transmitted by said pick-off means to drive the control surfaces of an aircraft in a direction to cause nulling of the pick-off signal derived from the pick-off means.

3. Apparatus for control of aircraft including a plurality of pendulum devices, wherein at least one of said pendulum devices comprises a reversible direct current motor having an operating element including at least one inductive winding, a first relay and a second relay, a first movable contact for said first relay connected to ground when the first relay is deenergized and to a power source when the first relay is energized, a second movable contact for said second relay connected to ground when the second relay is deenergized and to a power source when the second relay is energized, said movable contacts being electrically connected to opposite ends of the inductive winding of the motor, said motor having an output shaft, pendulum means bearingly and rotatably supported by said output shaft, a pendulum follow-up member fixedly secured to said output shaft and having a pair of depending legs, the legs being disposed on opposite sides of the pendulum, each of the legs having an end portion substantially parallel to the free swinging end of the pendulum in its neutral position, first and second electrical contact means adjustably disposed normal to the end portions of the respective legs of the pendulum follow-up member, said electrical contact means being positioned to engage contacts secured to the pendulum upon swinging of the pendulum, said contact means being relatively closely spaced from the contacts on the pendulum, said first relay being electrically connected at one end to one of the legs of the pendulum follow-up member and at the other end to a power source, said second relay being electrically connected at one end to the other leg of the pendulum follow-up member and at the other end to a power source, electrical grounding means connected to said pendulum whereby either continuous or cyclically interrupted engagement of the contact means on either leg of the pendulum follow-up member with one of the electrical contacts on the pendulum will cause energization of its respective relay to cause the relay contact to close to apply power and complete a circuit through the inductive winding of said motor, the power applied to the inductive winding of said motor causing the shaft to turn in a direction to follow movement of the pendulum, dynamic braking being applied upon removal of the pendulum follow-up electrical contact means from the adjacent contact on the pendulum for a sufficient time interval to deenergize the relay resulting in displacement of its movable contact and consequent deenergization of the inductive winding of the motor and the resultant imposition of a restraining force upon the motor by virtue of the characteristics of the direct current motor with a continuously excited field, and means associated with said pendulum device to cause the control surfaces of the aircraft to deviate from their null or stable position in response to displacement of the pendulum to restore the aircraft to the desired attitude.

4. The apparatus of claim 3 wherein said last named means comprises pick-off means associated with said pendulum follow-up member and a servo motor connected thereto and arranged to operate appropriate control surfaces of the aircraft in response to a signal from said pickoff means.

5. The device of claim 4 wherein a trimming device associated with each pendulum device includes means to modify the neutral position of said pendulum follow-up pick-off means to a null position corresponding to a different desired attitude than the first named desired attitude.

References Cited in the file of this patent

UNITED STATES PATENTS

| | | |
|---|---|---|
| 1,024,398 | Ellsworth | Apr. 23, 1912 |
| 1,485,783 | Gardner | Mar. 4, 1924 |
| 1,580,457 | Todd | Apr. 13, 1926 |
| 2,193,707 | Baumann | Mar. 12, 1940 |
| 2,201,226 | Carlson | May 21, 1940 |
| 2,352,044 | Steinen | June 20, 1944 |
| 2,368,673 | Metcalf | Feb. 6, 1945 |
| 2,496,100 | Marques | Jan. 31, 1950 |
| 2,579,570 | Hauptman | Dec. 25, 1951 |